May 10, 1927.
G. B. MAXWELL
1,627,660
GOVERNOR FOR POWER ATTACHMENTS
Filed Feb. 24, 1926    2 Sheets-Sheet 2
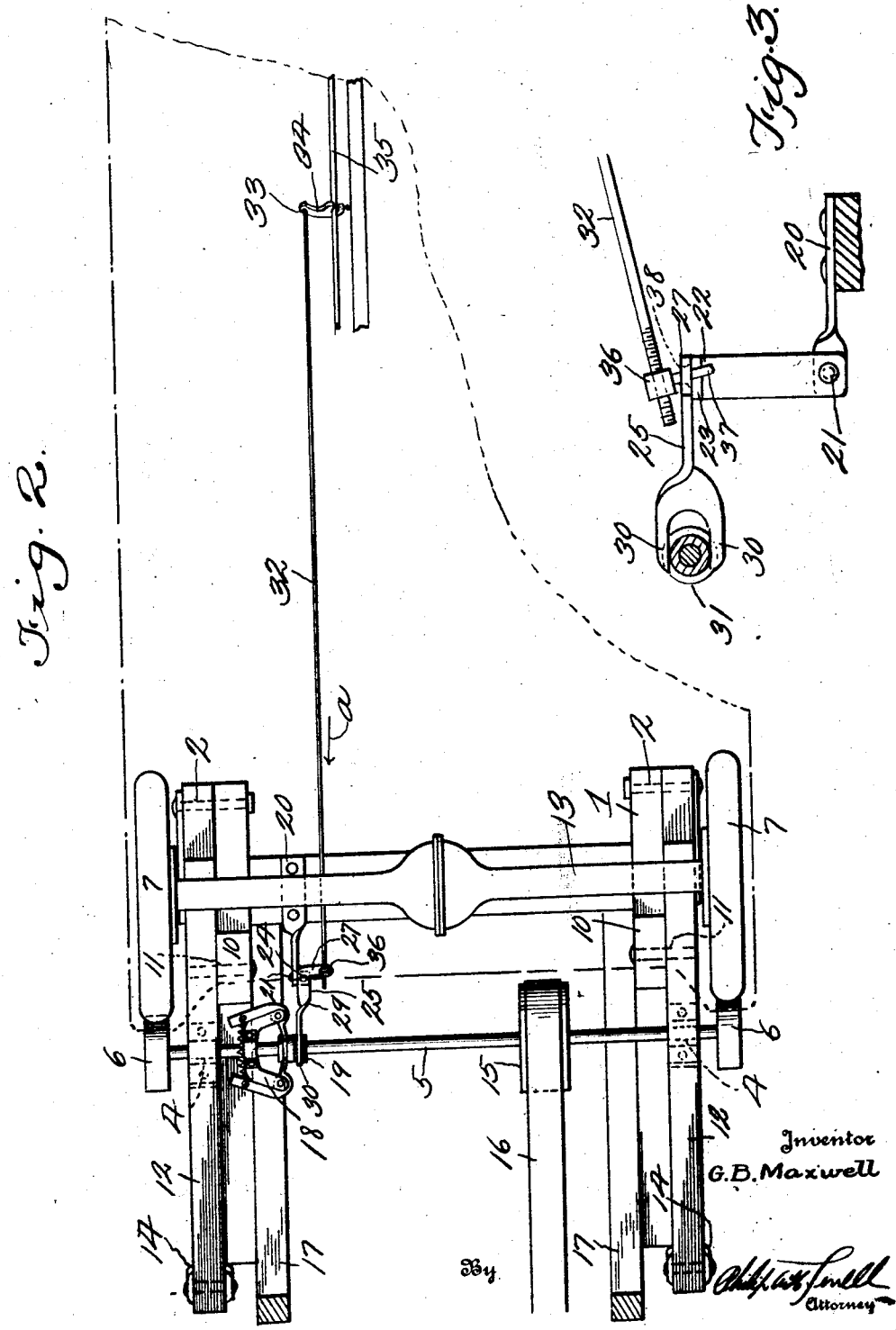
Inventor
G. B. Maxwell
By
Attorney Patented May 10, 1927.

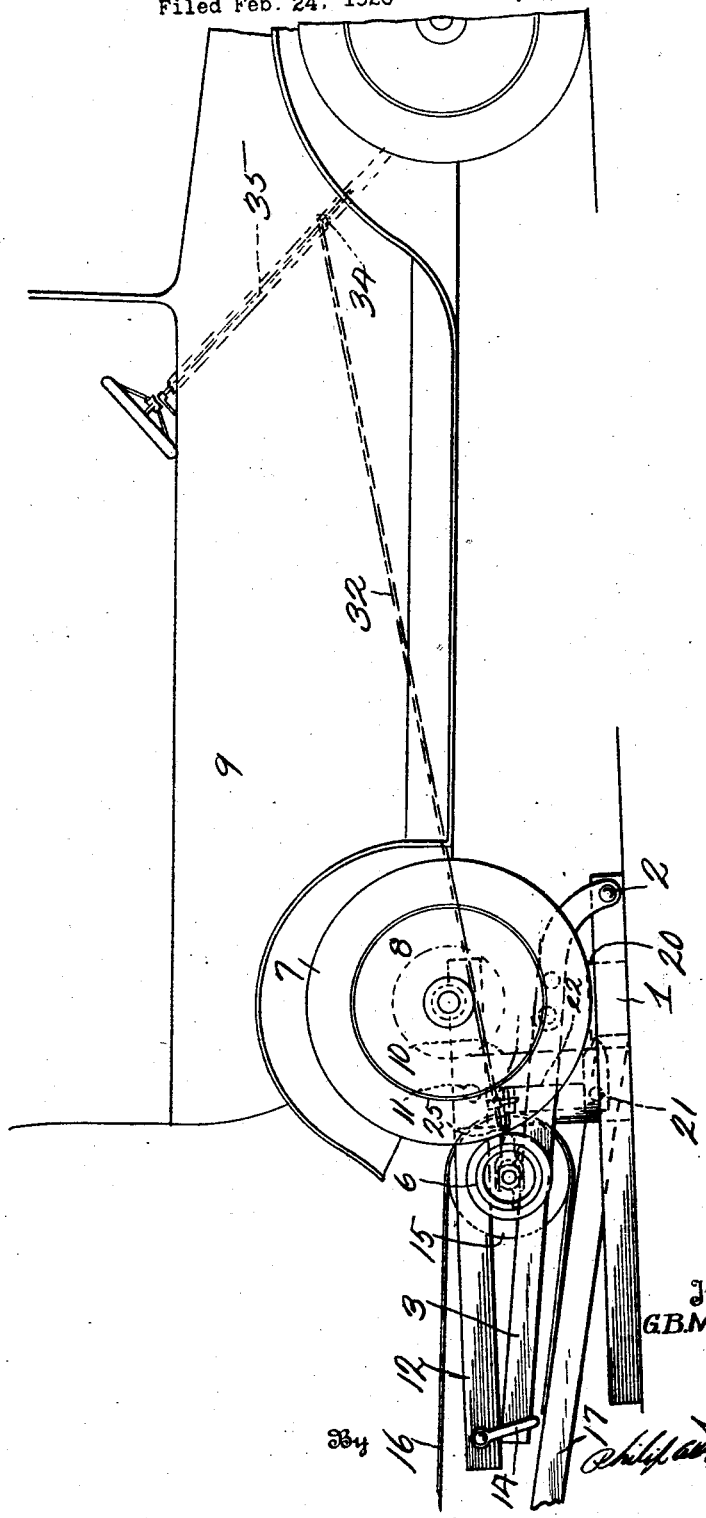

1,627,660

UNITED STATES PATENT OFFICE.

GEORGE B. MAXWELL, OF POTOSI, MISSOURI.

GOVERNOR FOR POWER ATTACHMENTS.

Application filed February 24, 1926. Serial No. 90,315.

The invention relates to governors for power attachments used in connection with automobiles, wherein the power attachment is disposed below the rear axle of the automobile and drives auxiliary machinery through mechanism cooperating with the automobile wheels. The governor attachment comprising a governor carried by the driven shaft of the power attachment and having rod and lever connections with the gas control rod of the automobile whereby the speed of the automobile engine may be maintained constant at all times, consequently the speed of operation of the power attachment maintained constant.

A further object is to provide the transverse shaft of the power attachment with a centrifugal governor controlling a slidable sleeve on the shaft, a bell crank lever having one of its arms cooperating with the slidable sleeve, and its other arm connected to a rod, which rod is in turn connected to an arm carried by the gasoline control rod.

A further object is to support the bell crank lever whereby it may move on its pivotal point in a transverse plane, and also move in a vertical longitudinal plane whereby the device may accommodate itself to various positions according to the diameter of the automobile tire and the variations of the ground level.

A further object is to provide a sleeve threaded on the control rod, and provided with a pin which extends through an aperture in one of the arms of the bell crank lever whereby an adjustment may be made by removing the pin from the aperture in the level arm and rotating the sleeve for adjusting the device according to the inclination of the base of the power attachment, for instance when the power attachment is on uneven ground, and for varying the speed of operation of the automobile.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the power attachment showing the same in position.

Figure 2 is a top plan view of the power attachment and a portion of the automobile.

Figure 3 is a side elevation of the power attachment control lever.

Referring to the drawings, the numeral 1 designates the base of the power attachment, which base has pivotally connected at 2 to opposite sides thereof, rearwardly and upwardly extending arms 3, which arms are provided with bearing members 4, in which is rotatably mounted a transversely disposed shaft 5. The ends of the shaft 5 are provided with drive pulleys 6, which pulleys upon an upward movement of the pivoted arms 3 are forced into engagement with the outer periphery of the tires 7 of the rear wheels 8 of the automobile 9, whereby upon a rotation of the wheels, with the pulleys 6 in engagement with the tires 7 thereof, rotation is imparted to the transversely disposed shaft 5. Extending upwardly from the base 1 are posts 10 to which are pivotally connected at 11 the substantially horizontally disposed arms 12, the inner ends of which are adapted to engage under the axle housing 13 at opposite ends thereof and the outer ends of which are provided with U-shaped pivoted members 14, which engage under the rear end of the pivoted arms 3, therefore it will be seen that when the weight of the automobile is supported on the pivoted arms 12, the U-shaped members 14 will force the arms 3 upwardly, and the drive pulleys 6 into close engagement with the peripheries of the tires 7, and it is obvious the amount of this movement would vary according to the size of the tires 7, and to the pressure of air therein, and the unevenness of the ground on which the base 1 rests. The transversely disposed shaft 5 is provided with a pulley 15, over which a belt 16 extends, and which belt may extend to any suitable auxiliary machine, for instance a saw mill, threshing machine or any machinery it is desired to operate. Extending rearwardly from the base 1 are arms 17, which may support in any suitable manner the auxiliary machinery to be driven, or wheels, whereby the device may be easily trailed behind a vehicle.

In devices of this character especially where the device is used for operating a saw it is desirable to automatically control the speed of operation thereof, and to accomplish this result the shaft 5 is provided with a conventional form of governor 18, which controls the sleeve 19 which is slidably mounted on the shaft 5, and in which the shaft 5 rotates. Secured to the base 1 is a rearwardly extending arm 20, to the outer end of which is pivotally connected at 21, an upwardly and outwardly extending arm 22, the branch 23 of which is substantially horizontally disposed, and pivotally connected at 24 is a bell crank lever 25, one arm of which extends transversely and is designated by the numeral 27, and the other arm 28 of which extends rearwardly and is provided with spaced fingers 30, which engage in the annular channel 31 of the sleeve 19, therefore it will be seen that as the speed of the shaft 5 increases the governor will move the sleeve 19 transversely, and through the medium of the bell crank lever 25 impart a pull on the connecting rod 32 in the direction of the arrow a, and as the connecting rod 32 is connected at 33 to an arm 34 carried by the gasoline control rod 35, which controls the flow of gasoline to the carbureter of the automobile, the speed of the engine will be reduced to the adjusted speed. It will be noted that as the speed of the shaft 5 is reduced through the control of the engine which drives the rear wheels 8, the speed thereof will be maintained constant at all times.

It is obvious where the ground is uneven on which the base 1 rests, and where the tires 7 are inflated to different degrees and are of different diameters there would necessarily be, under different conditions, an irregular control of the gasoline control rod 35, and it would be necessary to shorten or lengthen the connecting rod 32 to accommodate the device to the varying conditions, and to accomplish this result a sleeve 36 is threaded on the rear end of the rod 32 and which sleeve is provided with a pin 37, which extends through an aperture 38 in the arm 27 of the bell crank lever 25 and the operator can easily adjust the device by raising the pin 37 out of the aperture 38 and rotating the sleeve 36 on the threaded end of the rod 32 for adjusting the same to various positions and replacing the pin 37 in the aperture 38, and by providing the pivotal point 21 and 24, it is obvious the bell crank lever 25 may assume various positions in a transverse plane as well as a vertical longitudinal plane for accommodating the device to inaccuracies above enumerated.

From the above it will be seen that a governor attachment is provided for a power attachment for motor driven vehicles, which will positively govern and control the control rod of the gasoline feed mechanism of an automobile, thereby insuring a uniform speed of operation of the power attachment.

The invention having been set forth what is claimed as new and useful is:—

1. The combination with the driven shaft of an auxiliary power device driven by the rear wheels of an automobile supported on the device, a gasoline control lever for the engine of the automobile, of control means for said gasoline control lever, said control means comprising a bell crank lever adjacent the driven shaft, said bell crank lever being rockably mounted in a vertical longitudinal plane and pivotally movable in a transverse plane, a governor carried by the driven shaft and controlling the movement of the bell crank lever, a connecting rod connected to the gasoline control lever, a sleeve threaded on said connecting rod, said sleeve being provided with a pin, said pin being disposed in an aperture of one of the arms of the bell crank lever.

2. The combination with a transversely disposed driven shaft of a power attachment disposed beneath the drive wheels of an automobile, a gasoline control lever for the automobile, a governor control slidable sleeve on the shaft, of means for controlling the gasoline supply lever, said means comprising a bell crank lever pivotally mounted and movable in a vertical longitudinal plane and a transverse horizontal plane, a connecting rod connecting said bell crank lever and the gasoline control lever and an adjustable connection between the bell crank lever and the connecting rod.

In testimony whereof I hereunto affix my signature.

GEORGE BENJ. MAXWELL.